United States Patent
Steadman Booker et al.

(10) Patent No.: US 8,237,128 B2
(45) Date of Patent: Aug. 7, 2012

(54) APPARATUS, IMAGING DEVICE AND METHOD FOR COUNTING X-RAY PHOTONS

(75) Inventors: Roger Steadman Booker, Aachen (DE);
Christian Baeumer, Aachen (DE);
Christoph Herrmann, Aachen (DE);
Guenter Zeitler, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 472 days.

(21) Appl. No.: 12/518,299

(22) PCT Filed: Dec. 11, 2007

(86) PCT No.: PCT/IB2007/055021
§ 371 (c)(1),
(2), (4) Date: Jun. 9, 2009

(87) PCT Pub. No.: WO2008/072181
PCT Pub. Date: Jun. 19, 2008

(65) Prior Publication Data
US 2010/0020924 A1 Jan. 28, 2010

(30) Foreign Application Priority Data
Dec. 13, 2006 (EP) ..................... 06126001

(51) Int. Cl.
*G01T 1/24* (2006.01)
(52) U.S. Cl. .................................. 250/370.09
(58) Field of Classification Search .............. 250/370.09
See application file for complete search history.

(56) References Cited

U.S. PATENT DOCUMENTS

| 4,168,428 A | * | 9/1979 | Culver .......................... 250/263 |
| 4,591,984 A | | 5/1986 | Mori |

(Continued)

FOREIGN PATENT DOCUMENTS

| EP | 0574287 A2 | 6/1993 |
| EP | 1427189 A1 | 6/2004 |
| JP | 05180944 A | 7/1993 |
| WO | 9428438 A1 | 12/1994 |
| WO | 9707591 A1 | 2/1997 |

OTHER PUBLICATIONS

Larson: "Self-Gated Cardiac Cine MRI"; Magnetic Resonance in Medicine, vol. 51, 2004, pp. 93-102.

(Continued)

*Primary Examiner* — David Porta
*Assistant Examiner* — Mindy Vu (57) ABSTRACT

The present invention relates to an apparatus (10) for counting X-ray photons (12, 14). The apparatus (10) comprises a sensor (16) adapted to convert a photon (12, 14) into a charge pulse, a processing element (18) adapted to convert the charge pulse (51) into an electrical pulse (53) and a first discriminator (20) adapted to compare the electrical pulse (53) against a first threshold (TH1) and to output an event (55) if the first threshold (TH1) is exceeded. A first counter (22) counts these events (55), unless counting is inhibited by a first gating element (24). The first gating element (24) is activated when the first discriminator (20) outputs the event (55), and it is deactivated, when the processing of a photon (12, 14) is found to be complete or about to be completed by a measurement or by the knowledge about the time that it takes to process a photon (12, 14) in the processing element (18). By activating and deactivating the first counter (22) pile-up events, i.e. pile-up of multiple electrical pulses (53), can be addressed. The invention also relates to a corresponding imaging device and a corresponding method.

16 Claims, 8 Drawing Sheets

U.S. PATENT DOCUMENTS

| | | | |
|---|---|---|---|
| 4,882,503 | A | 11/1989 | Wakiyama et al. |
| 5,132,540 | A | 7/1992 | Adolph et al. |
| 6,936,822 | B2 | 8/2005 | Wong et al. |
| 7,126,386 | B2 * | 10/2006 | Tumer et al. .................. 327/70 |
| 7,615,753 | B2 * | 11/2009 | Audebert et al. ........ 250/370.07 |
| 2006/0276706 | A1 * | 12/2006 | Klein et al. .................. 600/407 |

OTHER PUBLICATIONS

Canberra Nuclear: "A Practical Guide to High Count Rate Germanium Spectrosocpy"; Application Note, Canberra Industries, Inc., Aug. 1993, 20 Page Document.

Kalender: "Computed Tomography: Fundamentals, System Technology, Image Quality": MCD Verlag, 2000.

* cited by examiner

APPARATUS, IMAGING DEVICE AND METHOD FOR COUNTING X-RAY PHOTONS

FIELD OF THE INVENTION

The present invention relates to an apparatus, an imaging device and a method for counting X-ray photons, in particular photons in a computer tomograph.

BACKGROUND OF THE INVENTION

Computer tomography (CT, also called computed tomography) has evolved into a commonly used means, when it comes to generating a three-dimensional image of the internals of an object. The three-dimensional image is created based on a large number of two-dimensional X-ray images taken around a single axis of rotation. While CT is most commonly used for medical diagnosis of the human body, it has also been found applicable for non-destructive materials testing. Detailed information regarding the basics and the application of CT, can be found in the book "Computed Tomography" by Willi A. Kalender, ISBN 3-89578-216-5.

One of the key innovative aspects in future CT and X-ray imaging is the energy-resolved counting of the photons which are let through or transmitted by the object being analyzed when being exposed to X-ray radiation. Depending on the number and energy the transmitted photons have (which have not been absorbed), it can be concluded through which type of material the X-ray radiation has traveled. In particular, this allows to identify different parts, tissues and materials within a human body. Even more specifically, the absorbing coefficient is energy dependent, thus developing a detector capable of resolving the energy of the impinging photons allows solving that dependency and leads to the elimination of "beam hardening" effects.

When the detection or counting of photons is referenced, it is understood, that when a photon impinges on the conversion material of a sensor, it creates a charge pulse (sometimes also referred to as current pulse). This charge pulse is detected and the presence of a photon is concluded. The charge pulse results from a larger number of electron-hole pairs, which are generated, when an X-ray photon interacts with the sensor conversion material. The duration of this charge pulse corresponds to the so-called charge collection time.

Detection of single electron-hole pairs is not in the focus of this application, but the processing of a charge pulse resulting from electron-hole pairs representing a photon, which may also be expressed by the formulations "detecting photons" or "counting photons". For a charge pulse, which is generated by interaction of an X-ray photon, also the formulation is used that the charge pulse belongs to this X-ray photon. Along the same lines, e.g. "processing a charge pulse caused by a photon impinging on the sensor" is sometimes also denoted as "processing a photon" in the following.

One of the main concerns when implementing a counting detector for computer tomography applications is to deal with the non-periodic nature of the incoming photons. The flux of photons, which has to be considered, is very high and randomly distributed in time. The distribution of the photons can be described by a Poisson distribution.

Due to the random distribution so-called pile-up events are likely to occur. This means, that one or more additional photons may arrive before the previous photon has been processed by the detector. Such pile-up events can lead to incorrect results and can significantly reduce the energy resolution of the imaging device.

The time window in which a new event cannot be detected, meaning that a new impinging photon cannot be processed, is called the dead time of the detector. When correctly considering the dead time of the detector, pile-up events can be better considered. However, there always remains the risk, that events/photons are only partly processed and/or that events/photons are disregarded.

One concept of how to address the rejection of pile-up pulses is described in the application note "A Practical Guide to High Count Rate Germanium Gamma Spectroscopy", by Can berra Industries, Inc.; no. NAN 0013, August 1993, pages 10-12.

SUMMARY OF THE INVENTION

It is an object of the present invention to provide an apparatus for counting X-ray photons, in particular photons in a computer tomograph, having an improved counting performance. It is a further object of the present invention to provide a corresponding imaging device based on the counting X-ray photons, in particular for medical use. It is yet another object of the present invention to provide an improved method for counting X-ray photons, in particular photons in a computer tomograph.

According to one aspect of the invention this object is achieved by an apparatus for counting X-ray photons, in particular photons in a computer tomograph, comprising a sensor adapted to convert a photon into a charge pulse (using materials like CdZnTe, CdTe, . . . ), a processing element adapted to convert the charge pulse into an electrical pulse, a first discriminator adapted to compare the electrical pulse against a first threshold and to output an event if the first threshold is exceeded, a first counter adapted to count events and a first gating element adapted to selectively suppress the counting of events by the first counter, wherein the first gating element comprises an activation input connected to an output of the first discriminator and a deactivation input associated with the state of the processing element, so that the counting by the first counter is inhibited when the first gating element is activated in order to deal with a pile-up of electrical pulses.

According to another aspect of the invention this object is achieved by an imaging device based on the counting of X-ray photons, in particular for medical use, comprising an apparatus as described before. Such an imaging device is in particular embodied as an X-ray machine, a computer tomograph, a device for nuclear medicine techniques (e.g. positron emission tomography or single photon emission computed tomography) or any other radiography device.

According to yet another aspect of the invention this object is achieved by a method for counting X-ray photons in particular photons in a computer tomograph, comprising the following steps:

converting a photon into a charge pulse, processing the charge pulse into an electrical pulse using a processing element, comparing the electrical pulse against a threshold, outputting an event, if the threshold is exceeded, and counting the event, if gating is deactivated, wherein gating is activated based on the event and gating is deactivated with regard to the state of the processing element, so that counting is inhibited when gating is activated in order to deal with a pile-up of electrical pulses.

Therefore, the present invention employs the concept of waiting for an event to occur, counting the event and then inhibiting the counting of further events until a specific situation or condition related to the processing element occurs.

Employing this approach it can be avoided that the processing of a certain event disturbs and corrupts the energy information of a subsequent event.

The deactivation input being associated with the state of the processing element means, that in order to relate the state of the deactivation input to the state of the processing element, it is possible, however not mandatory, to connect the deactivation input to a component of the processing element. In particular, as will be shown later on, it is possible to set the deactivation input based on an expected state of the processing element derived from general knowledge as to how the processing element processes a photon.

Regarding the term "connected" it should be appreciated, that while a direct connection may be one choice of design, it may also be possible to achieve this connection via an electrical/electronic element or even via an electrical network. Therefore, referring to "connected" elements may be understood in the sense that a change in the output condition of one element leads to a change in the input state of another element.

In a preferred embodiment the deactivation input is connected to an output of a clearing discriminator, which is adapted to compare the electrical pulse against a clearing threshold and to change the state of the deactivation input if a voltage of the electrical pulse goes below the clearing threshold.

In this embodiment a further discriminator, namely the clearing discriminator, is connected to the processing element, in particular to the output of the processing element, in order to monitor the electrical pulse over time. In particular this means, that the clearing discriminator sees an increasing voltage as the electrical pulse builds up and sees a decreasing voltage as the pulse fades away. The deactivation input is associated with the state of the processing element by an electrical connection. It is preferred that the deactivation input is connected to the output of the processing element, in particular, if the processing element comprises a shaper, to the output of the shaper.

The clearing discriminator will change the state of the deactivation input, if the current state or the current voltage level of the electrical pulse goes below the clearing threshold.

While it is possible to use a discriminator with two thresholds in order to establish a hysteresis, it is sufficient to employ a discriminator having one threshold. In this case, the state of the deactivation input also changes, (e.g. from 0 to 1) when the voltage of the electrical pulse goes above the clearing threshold. The clearing threshold is set to a voltage level which is indicative for the processing of a photon being completed or almost completed.

Overall, this embodiment provides the following functionality: a photon impinging on the sensor generates a charge pulse which is converted by the processing element into an electrical pulse. If the electrical pulse exceeds the first threshold of the first discriminator, the first discriminator generates an event which is counted by the first counter. This event is also received by the activation input of the first gating element, which in turn inhibits the further counting of subsequent events.

The electrical pulse which has led to the generation of the event, will fade away after having peaked. It should be noted that even if the event generated by the first discriminator, ends (e.g. indicated by a falling edge), the end of this event will not directly influence the state of the first gating element, since the deactivation input of the first gating element is connected to the processing element.

As the electrical pulse fades away, the processing element will achieve a state which is indicative for the processing of a photon being complete or about to be completed. This state is indicated by a certain voltage level being reached within or at the processing element, preferably at the output of the processing element. If a voltage of the electrical pulse being generated by the processing element goes below the clearing threshold, the state of the deactivation input will change in order to disable the inhibiting effect of the first gating element and to allow again the counting of events.

The benefit of this embodiment is that further counting is inhibited as soon as one event has been counted and that it is waited for the electrical pulse to go below the clearing threshold before counting is re-enabled. If a second event occurs quickly after the first event, the second event will not be counted, because the voltage of the electrical pulse will not go below the clearing threshold until a sufficient time has passed in order for the electrical to pulse fade away and to go below the clearing threshold. Therefore an effective and rather easy to implement concept is provided in order to deal with pile-up events.

In a further preferred embodiment the clearing threshold represents a baseline threshold of the processing element.

The baseline threshold of the processing element is understood as a threshold indicative of the processing element having finished or being about to finish processing a photon. In other words, a baseline threshold is an indication for the processing element being in a state that allows the next incoming photon to be correctly processed. In particular, if the processing element comprises a preamplifier and a shaper, the clearing threshold can be set to a level indicative of the shaper having finished or being about to finish shaping a pulse.

In this manner an effective means is achieved to determine when the processing of a photon is finished or about to be finished.

In a further preferred embodiment at least a second discriminator is connected in parallel to the first discriminator, the second discriminator being connected to a second counter adapted to count events, the second discriminator being adapted to compare the electrical pulse against a second threshold and to output an event when the second threshold is exceeded.

This embodiment improves the analysis of the photons regarding their energy, since a multi-threshold detector can be realized by making the second threshold different from the first threshold. For example, if the first threshold is lower than the second threshold, lower-energy events will only be counted by the first counter, whereas higher-energy events will be counted both by the first counter and the second counter. This allows to determine how many lower-energy events and how many higher-energy events have occurred. Of course, this approach can be extended to a plurality of discriminators/counters, so that more than two energy levels can be discriminated.

In a further preferred embodiment a second gating element adapted to selectively suppress the counting of events by the second counter is provided, wherein the second gating element comprises an activation input connected to the output of the second discriminator and a deactivation input connected to the output of the clearing discriminator.

This offers a relatively simple approach to join the second counter into the dealing with pile-up events. If an electrical pulse goes above the second threshold, the second discriminator outputs an event which is counted by the second counter. At this time the second gating element is activated inhibiting further events to be counted by the second counter. The second gating element is disabled substantially at the same time as the first gating element, namely when the voltage of the electrical pulse goes below the clearing threshold of the clearing discriminator.

It should be noted, that it is—of course—possible to provide a separate clearing discriminator for the second gating element. However, by using one clearing discriminator which disables both the first gating element and the second gating element, counting by the first counter and the second counter can be re-enabled practically at the same time.

In a further preferred embodiment a time measuring element is connected to an output of the first gating element. This allows to measure an actual dead time and/or an average dead time in order to efficiently correct for dead time effects, to address pile-up events to some extent and to be able to better determine the true rate of the observed events. As described in the introductory part of this application, it is difficult to deal with the dead time, since it can depend on the height of an event. In addition, the dead time can be extended by pile-up events in a random way driven by Poisson statistics leading to an extendable (paralyzable) dead time.

By measuring for how much time the counter has been disabled, the actual dead time can be determined. Also, by considering two or more measured dead times an average dead time can be obtained.

In a further preferred embodiment the deactivation input is connected to a timer, a start of the timer is triggered by the first discriminator, a time duration of the timer is set to a settling time of the processing element and a stop of the timer changes the state of the deactivation input.

This embodiment provides an effective yet simple means of dealing with a pile-up of multiple electrical pulses without requiring an actual connection between the processing element and the deactivation input. The functionality of this embodiment is as follows:

When an event is generated by the first discriminator, the event is counted by the first counter and the first gating element is activated, thereby inhibiting the further counting by the first counter. The timer is started and runs for a certain time, called settling time. This is the time during which, with a high statistical confidence, the processing of the photon is complete or about to be completed. The settling time represents how long the processing of a single photon takes and can be determined well based on mathematical calculations and/or empirical measurements. Therefore, when the timer stops it can be assumed with a high degree of statistical confidence, that the processing element is ready to process the next photon, even though the state of the processing element is not directly measured. When the timer stops, the state of the deactivation input is changed in order to deactivate the first gating element and to re-enable the counting of events.

If a second event quickly follows the first event, meaning the second event follows while the timer is still running, the timer is re-started and the second event is not counted. Only if during the specified time duration no further event occurs, the timer will hit the stop-condition and the first gating element will be deactivated.

It should be noted, that the concept of a multi-threshold detector as mentioned above can also be applied when using the timer.

In a further preferred embodiment the second counter comprises a disable-input, which when activated inhibits the second counter from counting a received event, the disable-input being connected to an output of the first gating element.

There are a number of different ways, in which a counter can be prevented from counting an event. For example, when using a switching element, in particular a semiconductor switching element, an event can be prevented from reaching the counter. However, there are drawbacks associated with the use of a switching element. It is therefore proposed, to provide the counter with a disable-input, which when activated does not count events arriving at the counter. This allows to quickly turn on/off counting without requiring an additional switching element.

It can be advantageous to provide a delay element between the output of the first gating element and the disable-input of the second counter. A situation could occur, that while an electrical pulse builds up, the first threshold of the first discriminator is exceeded thereby activating the first gating element, which in turn could disable the second counter even before the pulse has exceeded the second threshold, thereby inhibiting the second counter from counting this event. The delay element ensures, that a sufficient time is given after the first threshold has been exceeded before the second counter is disabled, in order to wait for whether the electrical pulse also exceeds the second threshold.

In a further preferred embodiment of the invention at least a third counter is provided, which is adapted to count the number of the events which are not counted by the first counter.

This improves the analysis of the incoming photons, because it is counted how many events have gone above the threshold and have not been counted due to the first counter being disabled. Of course, this concept can be extended to a plurality of counters, if required.

In a further preferred embodiment the third counter is connected to a logic element adapted to indicate when the first discriminator outputs an event while the first counter is disabled.

This provides a very simple yet efficient means to count the events that have not been counted by the first counter. In particular, an AND-element can be used, which is connected to an output of the first discriminator with the first port and to an output of the first gating element with the second port. Then, if an event is generated by the first discriminator and if at the same time the first gating element is activated, the event will be counted by the third counter.

In a further preferred embodiment of the invention the processing element comprises at least a preamplifier and at least a shaper.

This provides an effective means for realizing the processing element. Alternatively, it is also possible that the processing element comprises a shaping preamplifier.

In a further preferred embodiment the gating element is a flip-flop having a set-input as the activation input and a reset-input as the deactivation input.

The flip-flop is a cost-effective means for providing a gating element.

In a further preferred embodiment the first counter comprises a disable-input, which when activated inhibits the first counter from counting a received event, the disable-input being electrically connected to an output of the first gating element.

By providing the disable-input the counting of the counter can be turned on and off quickly and conveniently without having to provide an additional switching element.

These and other aspects of the invention will be apparent from an elucidated with reference to the embodiments described herein after.

It is to be understood that the features mentioned above and those yet to be explained below can be used not only in the respective combinations indicated but also in other combinations or as isolated features, without leaving the scope of the present invention.

BRIEF DESCRIPTION OF THE DRAWINGS

Embodiments of the invention are shown in the drawings and will be explained in more detail in the description below with reference to the same, in which.

DETAILED DESCRIPTION OF EXEMPLARY EMBODIMENTS

Figure 1:
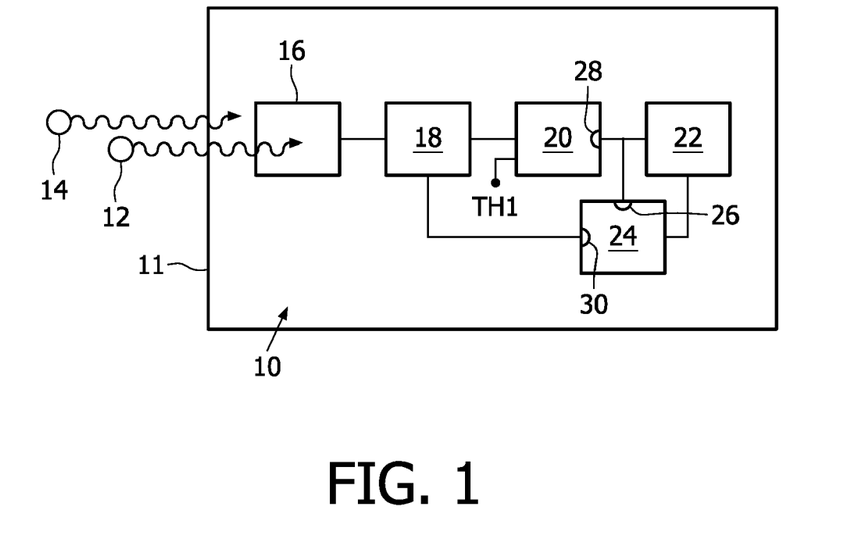
FIG. 1 shows an apparatus for counting photons in an imaging device.

FIG. 1 shows a high-level overview of an apparatus 10 for counting X-ray photons 12, 14. The apparatus 10 is embodied in an imaging device 11, in particular in a computer tomograph.

The apparatus 10 comprises a sensor 16 adapted to convert a photon 12, 14 into a charge pulse, a processing element 18 adapted to convert the charge pulse into an electrical pulse, a first discriminator 20 adapted to compare the electrical pulse against a first threshold TH1 and to output an event if the first threshold TH1 is exceeded. The apparatus 10 further comprises a first counter 22 adapted to count events and a first gating element 24 adapted to selectively suppress the counting of events by the first counter 22.

The first gating element 24 comprises an activation input 26 connected to an output 28 of the first discriminator 20 and a deactivation input 30 associated with the state of the processing element 18, so that the counting by the first counter 22 is inhibited when the first gating element 24 is activated in order to deal with a pile-up of multiple electrical pulses. A more detailed description of the apparatus 10 will be provided by the following description.

Figure 2:
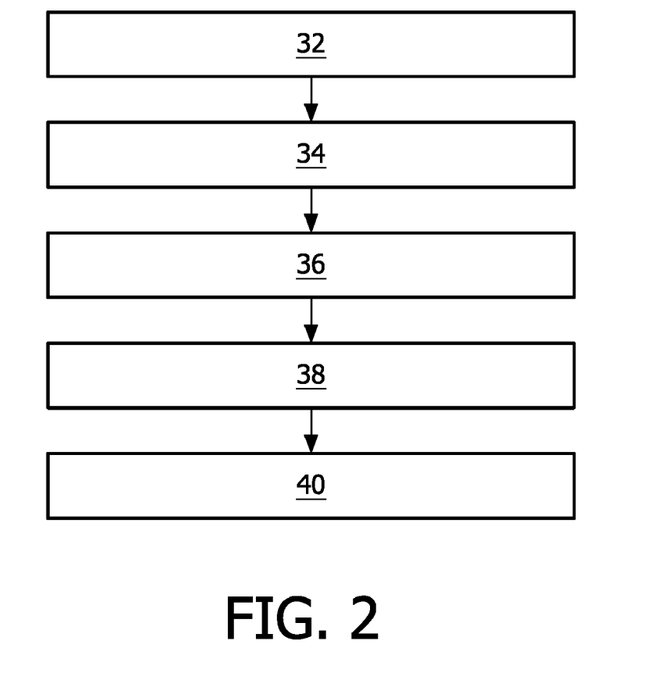
FIG. 2 shows a method for counting photons in a computer tomograph.

FIG. 2 shows the basic steps when counting X-ray photons 12, 14, in particular photons 12, 14 in a computer tomograph, according to the present invention.

In step 32 a photon 12, 14 impinging on the sensor 16 is converted into a charge pulse. Then, in step 34, the charge pulse is processed into an electrical pulse, in particular by the processing element 18.

In step 36, the electrical pulse is compared against a threshold, in particular compared against the first threshold TH1 of the first discriminator 20. In response to this comparison, an event is outputted (step 38), if the threshold is exceeded.

The event is counted (step 40), in particular using the first counter 22, if gating is deactivated. Gating is activated based on the event and is deactivated with regard to the state of the processing element 18. This allows to inhibit counting when gating is activated in order to deal with a pile-up of multiple electrical pulses.

Figure 3:
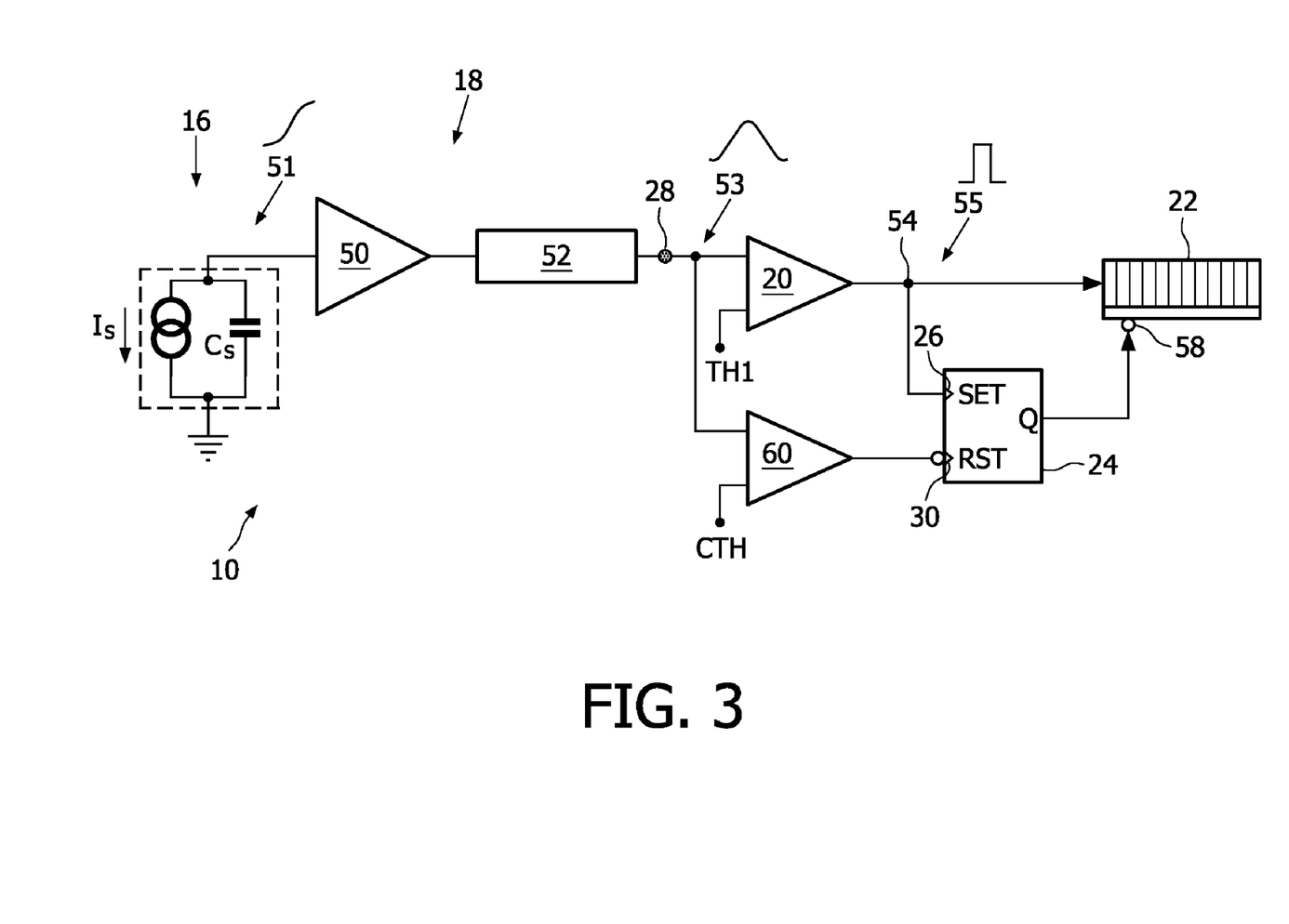
FIG. 3 shows a first embodiment of the apparatus according to the present invention.

FIG. 3 shows a first embodiment of the apparatus 10 according to the present invention.

The sensor 16 is symbolized as a current source providing a current $I_s$ in parallel to a capacitance $C_s$. The processing element 18 is implemented by a preamplifier 50, that receives a charge pulse 51 from the sensor 16, followed by a shaper 52. While the preamplifier 50 essentially acts as an integrator for the charge pulse 51 coming from the sensor 16, the shaper 52 provides an electrical pulse 53 having a rising flank and a falling flank. The output 28 of the processing element 18 corresponds in this case to an output of the shaper 52.

The first discriminator 20 is connected to the output 28 of a processing element 18, and an output 54 of the first discriminator 20 is connected to an input of the first counter 22.

The first gating element 24 is embodied as a flip-flop, having a set-input as the activation input 26 and a reset-input as the deactivation input 30.

The first gating element 24 further comprises an output Q, which is connected to the first counter 22. In this embodiment, the first counter 22 has a disable-input 58 indicated by a small circle negating the signal coming from the first gating element 24. This means, if the first gating element 24 provides a HIGH-signal, in particular a "1", the counting of the first counter 22 is inhibited. Vice versa, when the first gating element 24 provides a LOW-signal, in particular a "0", the first counter 22 counts incoming events 55.

As shown, the output 54 of the first discriminator 20 is connected to the activation input 26 of the first gating element 24. Therefore, if an event 55 is provided by the first discriminator 20, in particular if a rising edge is provided by the first discriminator 20, the event 55 is also received by the activation input 26 and the state of the first gating element, as indicated by the output Q, is set to "1". It should be noted, that it is not actually necessary to provide a "1" or a "0". It is sufficient to use two distinguishable voltage levels, wherein one voltage level indicates that counting is to be inhibited while the other voltage level indicates that counting is to be performed.

The deactivation input 30 of the first gating element 24 is connected to a negated output of a clearing discriminator 60, which compares the electrical pulse 53 present at the output 28 of the processing element 18 to a clearing threshold CTH. This means, if the electrical pulse 53 exceeds the clearing threshold CTH, a "1" is provided by the clearing discriminator 60, however, due to the negating element, the deactivation input 30 receives a "0". Therefore, no reset is performed and the state of the first gating element 24 does not change. If the electrical pulse 53 goes below the clearing threshold CTH, the deactivation input 30 receives a "1" and the state of the first gating element 24 is resetted, in this case the output Q becomes "0".

In summary, if the electrical pulse 53 exceeds the first threshold TH1, the first discriminator 20 generates an event 55, which is counted by the first counter 22. At the same time, the event 55 is received at the activation input 26 of the first gating element 24, setting the output Q to "1", which is received by the disable-input 58 of the first counter 22. Only when the electrical pulse 53 goes below the clearing threshold CTH of the clearing discriminator 60, the deactivation input 30 of the first gating element 24 is triggered and the output Q of the first gating element 24 is set to "0", which re-enables the first counter 22.

Figure 4:
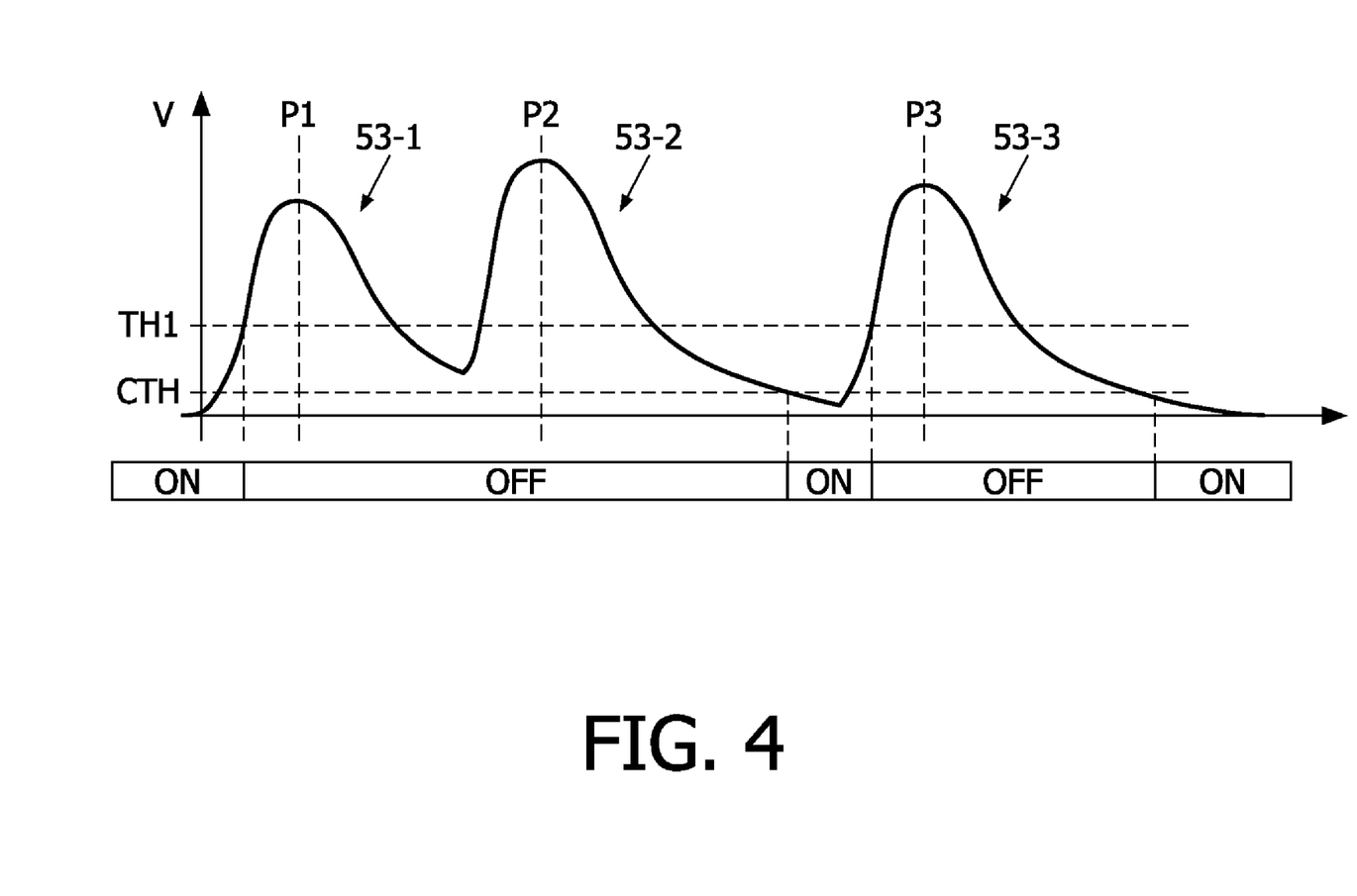
FIG. 4 shows how a pile-up of pulses is dealt with according to the present invention.

The beneficial effect of the apparatus 10 is shown in FIG. 4, where along a time axis t and a voltage axis V the occurrence of three electrical pulses 53-1, 53-2, 53-3 is shown. As can be seen from their respective peaks P1, P2, P3 the electrical pulses 53-1, 53-2, 53-3 are not evenly spaced. In particular it is assumed, that the peaks P1, P2 represent a pile-up situation. Below the diagram a bar is shown, which indicates the current state of the first counter 22, wherein "ON" denotes that the first counter 22 will count events 55 and "OFF" denotes that the first counter 22 will not count events 55.

Initially, the first electrical pulse 53-1 is below both the first threshold TH1 and the clearing threshold CTH. The first counter 22 is ON. As the electrical pulse 53-1 rises, it goes above the first threshold TH1, whereby the first discriminator 20 outputs an event 55, which is counted by the first counter 22, the first gating element 24 is enabled and the first counter 22 is turned OFF.

After having peaked at P1, the electrical pulse 53-1 fades away and goes below the first threshold TH1, however remaining above the clearing threshold CTH. It should be noted, that this situation does not lead to a change in the state of the first gating element 24 or a state of the first counter 22.

Before the first electrical pulse 53-1 goes below the clearing threshold CTH the second electrical pulse 53-2 comes in and rises above the first threshold TH1. Again, the first discriminator 20 generates an event 55. However, since the first counter 22 is OFF, this event 55 is not counted.

After having peaked at P2 the second electrical pulse 53-2 fades away and goes below the first threshold TH1 and then below the clearing threshold CTH. At this time the first gating element 24 is reset, thereby turning the first counter 220N.

The third electrical pulse 53-3 coming in, rises above the first threshold TH1, which leads to the generation of a further event 55. Since the first counter 22 is on, this event 55 is counted. At the same time the first counter 22 is turned OFF again, until the electrical pulse 53-3 goes below the clearing threshold CTH.

As can be seen, the presented apparatus 10 provides a very effective means of dealing with pile-up events.

Figure 5:
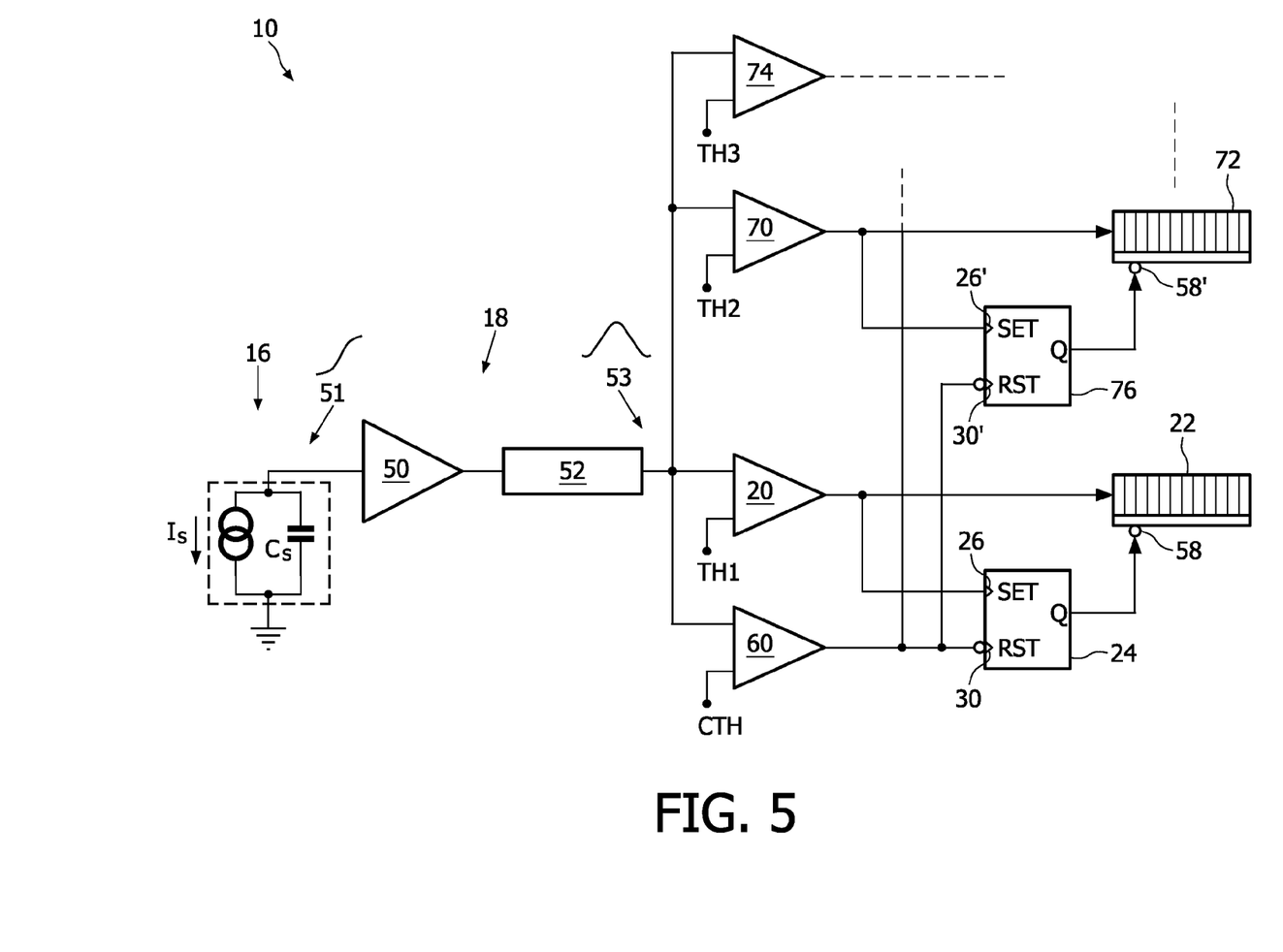
FIG. 5 shows a second embodiment of the apparatus according to the present invention.

FIG. 5 shows a second embodiment of an apparatus 10 according to the present invention which employs multiple thresholds for discriminating the energy levels of the incoming photons 12, 14.

The shown apparatus 10 bases on the apparatus 10 according to FIG. 3, so that only the differences will be described in the following.

The apparatus 10 comprises a second discriminator 70 which is connected in parallel to the first discriminator 20. The second discriminator 70 is connected to a second counter 72 which is adapted to count events. Further, the second discriminator 70 is adapted to compare the electrical pulse 53 against a second threshold TH2 and to output an event if the second threshold TH2 is exceeded.

As indicated by a third discriminator 74 having a third threshold TH3, this concept can be extended to a plurality of discriminators and a plurality of counters. However, for clarity reasons, only the necessary basics regarding the introduction of the second discriminator 70 are explained.

The apparatus further comprises a second gating element 76 which is adapted to selectively suppress the counting of events 55 by the second counter 72. As seen with the respect to the first gating element 24 the second gating element 76 also comprises an activation input 26' and a deactivation input 30'. The activation input 26' is connected to an output of the second discriminator 70 and the deactivation input 30' is connected to the negated output of the clearing discriminator 60.

The first counter 22 is disabled when an electrical pulse 53 goes above the first threshold TH1, and the second counter 72 is disabled when the electrical pulse 53 goes above the second threshold TH2. Both counters 22, 72 are re-enabled, when the electrical pulse 53 goes below a clearing threshold CTH.

The second threshold TH2 is preferably set higher than the first threshold TH1. Then, the first counter 22 will receive all events that exceed the first threshold TH1, while the second counter 72 only receives events that exceed the first threshold TH1 and the second threshold TH2. By subtracting the value of the second counter 72 from the value of the first counter 22, it can be calculated how many electrical pulses 53 have exceeded the first threshold TH1 but not the second threshold TH2. Thereby a discrimination based on the energy levels of the photons 12, 14 can be achieved.

Figure 6:
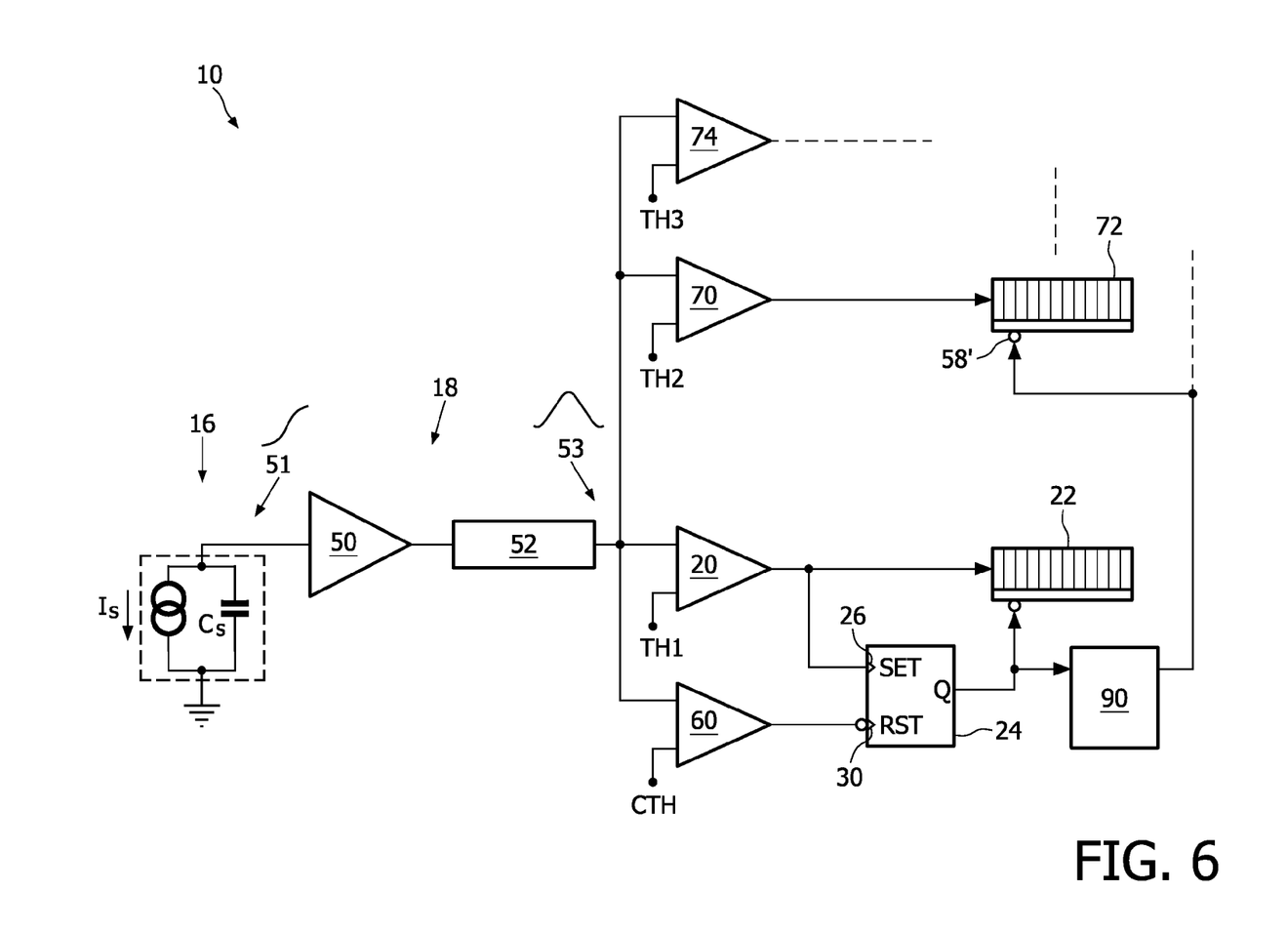
FIG. 6 shows a third embodiment of the apparatus according to the present invention.

FIG. 6 shows a third embodiment of the apparatus 10 according to the present invention. It is similar to the embodiment shown in FIG. 5, however the concept of gating the second counter 72 is changed. While this difference is explained in more detail, reference is made to FIG. 5 for all other details.

As shown, a disable-input 58' of the second counter 72 is connected to the output Q of the first gating element 24 via a delay element 90. This means, that a signal coming from the first gating element 24 disabling the first counter 22 is transmitted to the second counter 72 delayed by a certain time duration specified by the delay element 90.

While the delay element 90 is not mandatory, it is preferably used in order to avoid a situation, where the second counter 72 is disabled, due to the electrical pulse 53 exceeding the first threshold TH1, before the electrical pulse 53 has risen above the threshold TH2, thereby the second counter 72 missing a count.

Figure 7:
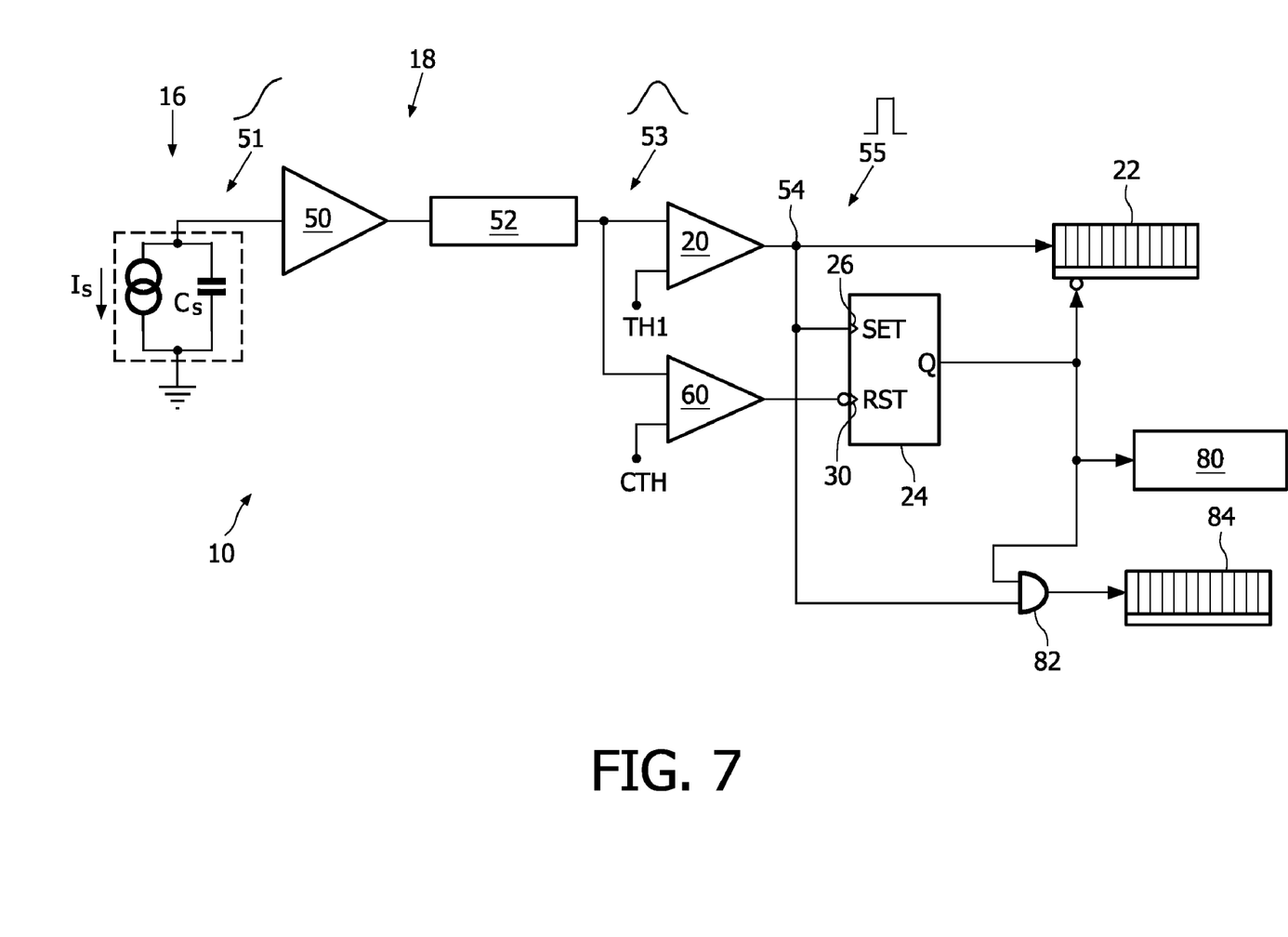
FIG. 7 shows a fourth embodiment of the apparatus according to the present invention.

FIG. 7 shows a fourth embodiment of an apparatus 10 according to the present invention. The shown apparatus 10 bases on the apparatus 10 shown in FIG. 3 so that reference is made to the explanations given there.

This fourth embodiment offers two additional features which can be employed in combination or separately, one without the other.

The first additional feature is represented by a time measuring element 80 which is connected to the output Q of the first gating element 24. The time measuring element 80 measures the duration for which the first counter 22 is disabled. This allows to calculate an actual dead time of the apparatus 10 and, when considering at least two measured dead times, an average dead time can be calculated. Having a good estimate for the dead time allows for a better interpretation of the obtained data.

The second additional feature is based on a logic element 82, here an AND-element, which is adapted to indicate when the first discriminator 20 outputs an event 55 while the first counter 22 is disabled. This is achieved by one input of the logic element 82 being connected to the output 54 of the first discriminator 20 and the other input being connected to the output Q of the first gating element 24.

The output of the logic element 82 is fed to a third counter 84, which thereby counts events 55 generated by the first discriminator 20 but not counted by the first counter 22. This allows to count the pile-up events that have occurred regarding the first counter 22.

Figure 8:
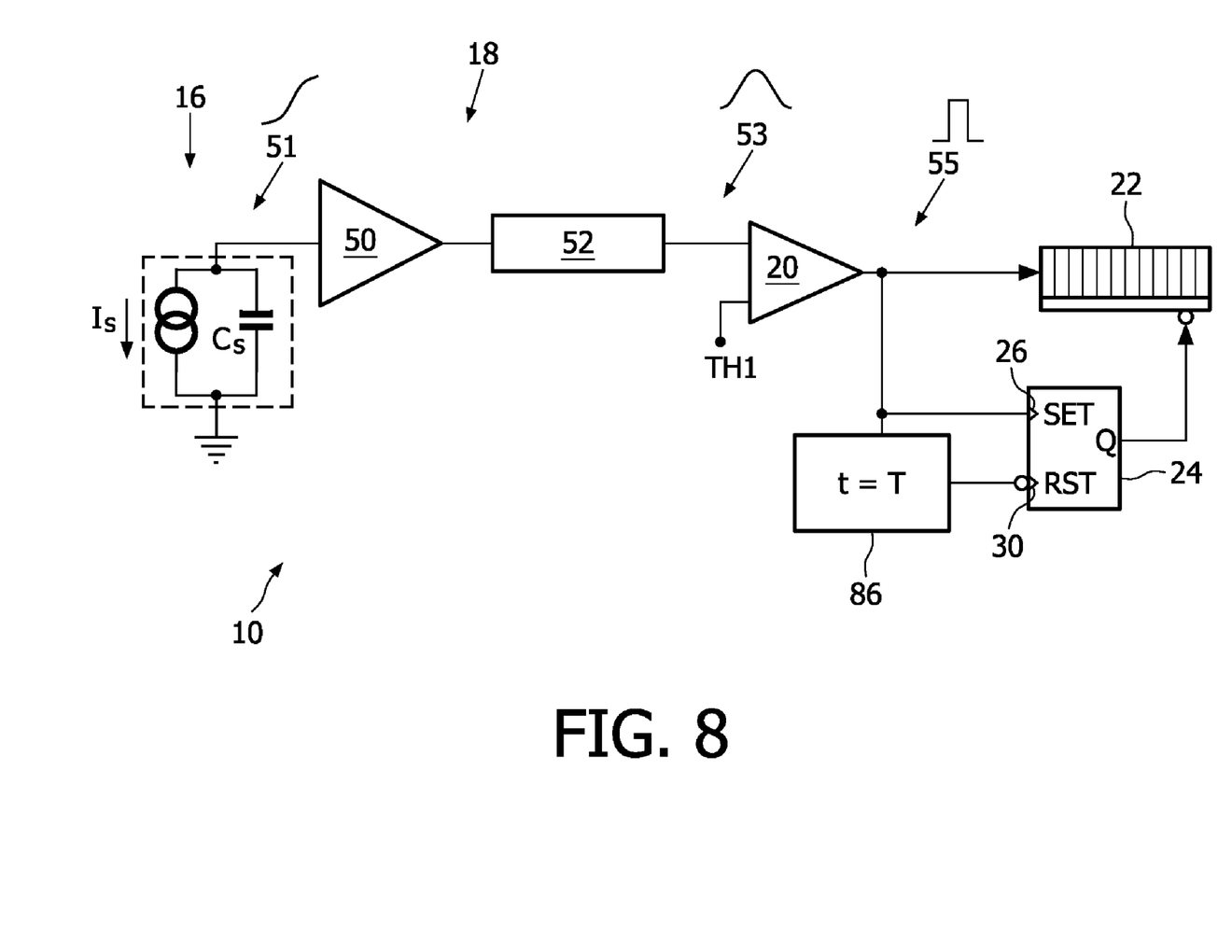
FIG. 8 shows a fifth embodiment of the apparatus according to the present invention.

FIG. 8 shows a fifth embodiment of an apparatus 10 according to the present invention. This embodiment is similar to the apparatus 10 shown in FIG. 3, however, a different concept for re-enabling the first counter 22 is employed. In this embodiment, the deactivation input 30 is associated with the state of a processing element 18 not by means of an electrical connection but based on the knowledge of how much time the processing element 18 requires to process a photon 12, 14.

Like in the previous embodiments the first counter 22 is disabled by the first gating element 24, if the first discriminator 20 generates an event 55. However, different from the previous embodiments, here the occurrence of the event 55 also triggers a start condition of a timer 86.

The timer 86 is adapted to wait for a specified time duration before a stop-condition occurs, providing the deactivation input 30 of the first gating element 24 with a LOW-signal or a "0". The time duration set in the timer 86 corresponds to the expected time the processing element 18 will need to process a received photon 12, 14 after the beginning of the event 55 has been detected.

In other words, when the processing of a photon 12, 14 by the processing element 18 is indicated by the beginning of the event 55, the first counter 22 is disabled and is only re-enabled when the time duration that is expected to be required for processing a photon 12, 14, has elapsed.

Since the processing of a photon 12, 14 is well-known and the time associated with a processing can be determined either theoretically or practically, there is a very good association of the deactivation input with the state of the processing element 18 without requiring a direct connection.

Also for this embodiment, dealing with a pile-up of events (or electrical pulses) is addressed. If a second photon 14 follows too quickly after the first photon 12, meaning before the time duration has passed, the new event 55 associated with the second photon 14 will restart the timer 86 which will now run again for the full time duration. Only when the time duration passes before a new event 55 is generated, the timer 86 will reset the first gating element 24, thereby re-enabling the first counter 22.

It should be noted, that even though the association of the deactivation input 30 with the state of the processing element 18 is not achieved by an electrical connection, the resulting effect of this embodiment is comparable to the previous embodiments.

Figure 9:
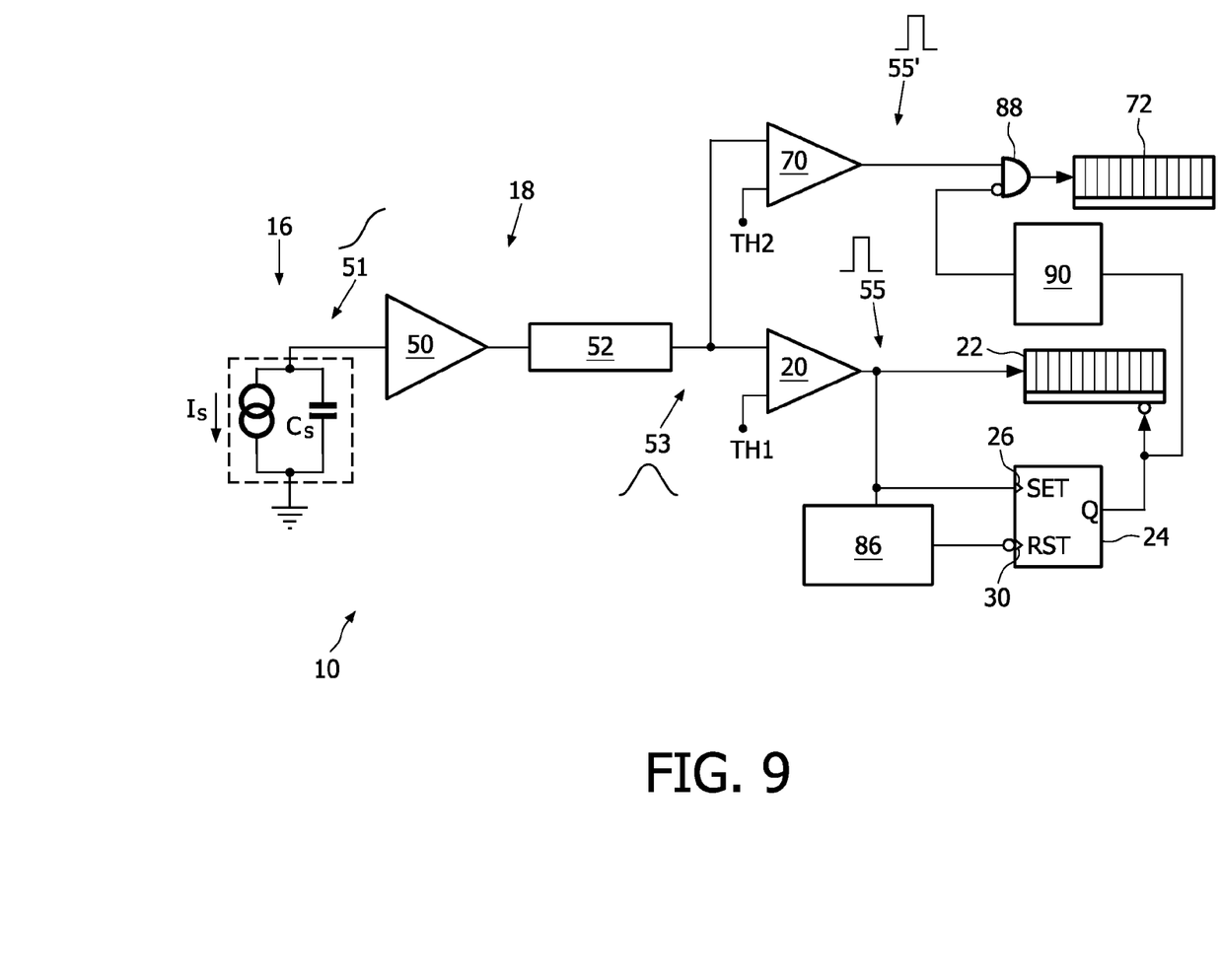
FIG. 9 shows a sixth embodiment of the apparatus according to the present invention.

FIG. 9 shows a sixth embodiment of an apparatus 10 according to the present invention. This embodiment bases on the embodiment of FIG. 8, so that reference is made to FIG. 8 for an explanation of the basic functionality. Furthermore, this embodiment employs a second discriminator 70 and a second counter 72 as has been explained in detail with reference to the embodiment of FIG. 6. Therefore, further reference is made to the explanations of FIG. 6.

In the embodiment of FIG. 9 it is assumed, that the second counter 72 is a simple standardized counter without a specific disable-input. However, the effect of a disable-input can be achieved by placing a logic element 88, here a AND-element, before the second counter 72, wherein the logic element 88 is adapted to let events 55' pass to the second counter 72, as long as the output Q of the first gating element 24—delayed by the delay element 90—does not send a HIGH-signal to the logic element 88. In this embodiment, the delay imposed by the delay element 90 is set to the charge collection time.

This means, if an electrical pulse 53 rises above the first threshold TH1, the first discriminator 20 will output an event 55 which activates the first gating element 24, thereby disabling the first counter 22 after the given event has been counted. At the same time, the event 55 has triggered the start of the timer 86.

The signal from the output Q of the first gating element 24 is routed to the logic element 88, however delayed by the delay element 90. This time period, i.e. before the signal from the first gating element 24 actually arrives at the logic element 88, is applied in order to wait, if the electrical pulse 53 also exceeds the second threshold TH2, therefore representing an electrical pulse 53 that also has to be counted by the second counter 72. This means, if the electrical pulse 53 indeed goes above the second threshold TH2, the corresponding event 55' is counted by the second counter 72 before the signal from the first gating element 24 sets one input of the logic element 88 to "0" thereby inhibiting events 55' from the second discriminator 70 to arrive at the second counter 72.

As can be seen from this embodiment, a combination of a counter and logic element can be used to replace a counter with a specific disable-input.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The terms "left", "right", etc. are used only for an eased understanding of the invention and do not limit the scope of the invention.

While several components have been disclosed and shown separately in order to ease an understanding of the invention, it should be appreciated, that due to being able to integrate electrical/electronic components, two or more components can also be combined into one component comprising the functionality/features of these two or more components.

The mere fact that certain measures are recited in mutually different dependent claims does not indicate that a combination of these measures cannot be used to advantage. Any reference signs in the claims should not be construed as limiting the scope.

The invention claimed is:

1. An apparatus for counting X-ray photons, in particular photons in a computer tomograph, comprising a sensor adapted to convert a photon into a charge pulse, a processing element adapted to convert the charge pulse into an electrical pulse, a first discriminator adapted to compare the electrical pulse against a first threshold and to output an event if the first threshold is exceeded, a first counter adapted to count events and a first gating element adapted to selectively suppress the counting of events by the first counter, wherein the first gating element comprises an activation input connected to an output of the first discriminator and a deactivation input associated with the state of the processing element, so that the counting by the first counter is inhibited when the first gating element is activated in order to deal with a pile-up of electrical pulses.

2. The apparatus according to claim 1, wherein the deactivation input is connected to an output of a clearing discriminator, which is adapted to compare the electrical pulse against a clearing threshold and to change the state of the deactivation input if a voltage of the electrical pulse goes below the clearing threshold.

3. The apparatus according to claim 1, wherein the clearing threshold represents a baseline threshold of the processing element.

4. The apparatus according to claim 1, wherein at least a second discriminator is connected in parallel to the first discriminator, the second discriminator being connected to a second counter adapted to count events, the second discriminator being adapted to compare the electrical pulse against a second threshold and to output an event if the second threshold is exceeded.

5. The apparatus according to claim 4, further comprising a second gating element adapted to selectively suppress the counting of events by the second counter, wherein the second gating element comprises an activation input connected to an output of the second discriminator and a deactivation input connected to the output of the clearing discriminator.

6. The apparatus according to claim 4, wherein the second counter comprises a disable-input, which when activated inhibits the second counter from counting a received event, the disable-input being connected to an output of the first gating element.

7. The apparatus according to claim 1, wherein a time measuring element is connected to an output of the first gating element.

8. The apparatus according to claim 1, wherein the deactivation input is connected to a timer, a start of the timer is triggered by the first discriminator, a time duration of the timer is set to a settling time of the processing element and a stop of the timer changes the state of the deactivation input.

9. The apparatus according to claim 8, wherein at least a second discriminator is connected in parallel to the first discriminator, the second discriminator being connected to a second counter adapted to count events, the second discriminator being adapted to compare the electrical pulse against a second threshold and to output an event when the second threshold is exceeded.

10. The apparatus according to claim 1, further comprising at least a third counter adapted to count the number of events which are not counted by the first counter.

11. The apparatus according to claim 10, wherein the third counter is connected to a logic element adapted to indicate when the first discriminator outputs an event while the first counter is disabled.

12. The apparatus according to claim 1, wherein the processing element comprises at least a preamplifier and at least a shaper.

13. The apparatus according to claim 1, wherein the gating element is a flip-flop having a set-input as the activation input and a reset-input as the deactivation input.

14. The apparatus according to claim 1, wherein the first counter comprises a disable-input, which when activated inhibits the first counter from counting a received event, the disable-input being connected to an output of the first gating element.

15. An imaging device based on the counting of X-ray photons, in particular for medical use, comprising an apparatus according to claim 1.

16. A method for counting X-ray photons, in particular photons in a computer tomograph, comprising the following steps:
converting a photon into a charge pulse,
processing the charge pulse into an electrical pulse using a processing element,
comparing the electrical pulse against a threshold,
outputting an event, if the threshold is exceeded, and
counting the event, if gating is deactivated,
wherein gating is activated based on the event and gating is deactivated with regard to the state of the processing element, so that counting is inhibited when gating is activated in order to deal with a pile-up of electrical pulses.

* * * * *